US012567934B2

(12) United States Patent
Li

(10) Patent No.: US 12,567,934 B2
(45) Date of Patent: Mar. 3, 2026

(54) TCI STATE DETERMINATION METHOD AND APPARATUS

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 362 days.

(21) Appl. No.: 18/032,017

(22) PCT Filed: Oct. 14, 2020

(86) PCT No.: PCT/CN2020/120766
§ 371 (c)(1),
(2) Date: Apr. 14, 2023

(87) PCT Pub. No.: WO2022/077247
PCT Pub. Date: Apr. 21, 2022

(65) Prior Publication Data
US 2023/0291526 A1      Sep. 14, 2023

(51) Int. Cl.
*H04L 5/00* (2006.01)

(52) U.S. Cl.
CPC ................................. *H04L 5/0053* (2013.01)

(58) Field of Classification Search
CPC ... H04L 5/0053; H04L 5/0023; H04L 5/0091; H04L 5/0058
See application file for complete search history.

(56) References Cited

U.S. PATENT DOCUMENTS

| | | | | |
|---|---|---|---|---|
| 2019/0342907 A1* | 11/2019 | Huang | ................... | H04W 72/23 |
| 2020/0045709 A1* | 2/2020 | Seo | ...................... | H04W 72/53 |
| 2020/0305134 A1* | 9/2020 | Noh | ...................... | H04L 5/0053 |
| 2021/0014837 A1* | 1/2021 | Papasakellariou | .... | H04L 5/0053 |
| 2021/0022182 A1* | 1/2021 | Mondal | .............. | H04W 56/001 |
| 2021/0076269 A1* | 3/2021 | Awoniyi-Oteri | .... | H04W 36/083 |
| 2021/0409094 A1* | 12/2021 | Yuan | ..................... | H04W 76/19 |

FOREIGN PATENT DOCUMENTS

| | | |
|---|---|---|
| CN | 110474751 A | 11/2019 |
| WO | WO 2020198645 A1 | 10/2020 |

OTHER PUBLICATIONS

3GPP TSG-RAN WG2#100, R2-1713534 Title:MAC PDU discard at split bearer/SCG bearer reconfiguration (Year: 2017).*
3GPP TSG-RAN2#112-e R2-2009458 Title:Coexistance of CG and RACH configuration for SDT (Year: 2020).*
European Patent Application No. 20957028.2, Search and Opinion dated Oct. 26, 2023, 7 pages.
PCT/CN2020/120766, English translation of Search Report dated Jul. 14, 2021, 2 pages.

* cited by examiner

*Primary Examiner* — Faruk Hamza
*Assistant Examiner* — Abusayeed M Haque
(74) *Attorney, Agent, or Firm* — Cozen O'Connor

(57) ABSTRACT

A transmission configuration indicator (TCI) state determination method and apparatus includes receiving an indication signaling; and determining, according to the indication signaling, N TCI states corresponding to a search space set of the terminal, N being a positive integer by reading a configuration of the search space set from the indication signaling, including TCI state identifiers of the N TCI states corresponding to the search space set.

14 Claims, 3 Drawing Sheets

202 receiving an indication signaling reading configuration of the search space set from the indication signaling, wherein the configuration of the search space set comprises: TCI state identifiers of the N TCI states corresponding to the search space set 204a

202 receiving an indication signaling

204b reading one or more control resource set CORESET to which the search space set belongs and a TCI state corresponding to each CORESET from the indication signaling 204c determining the TCI state corresponding to each CORESET to which the search space set belongs as the TCI states corresponding to the search space set

FIG. 4

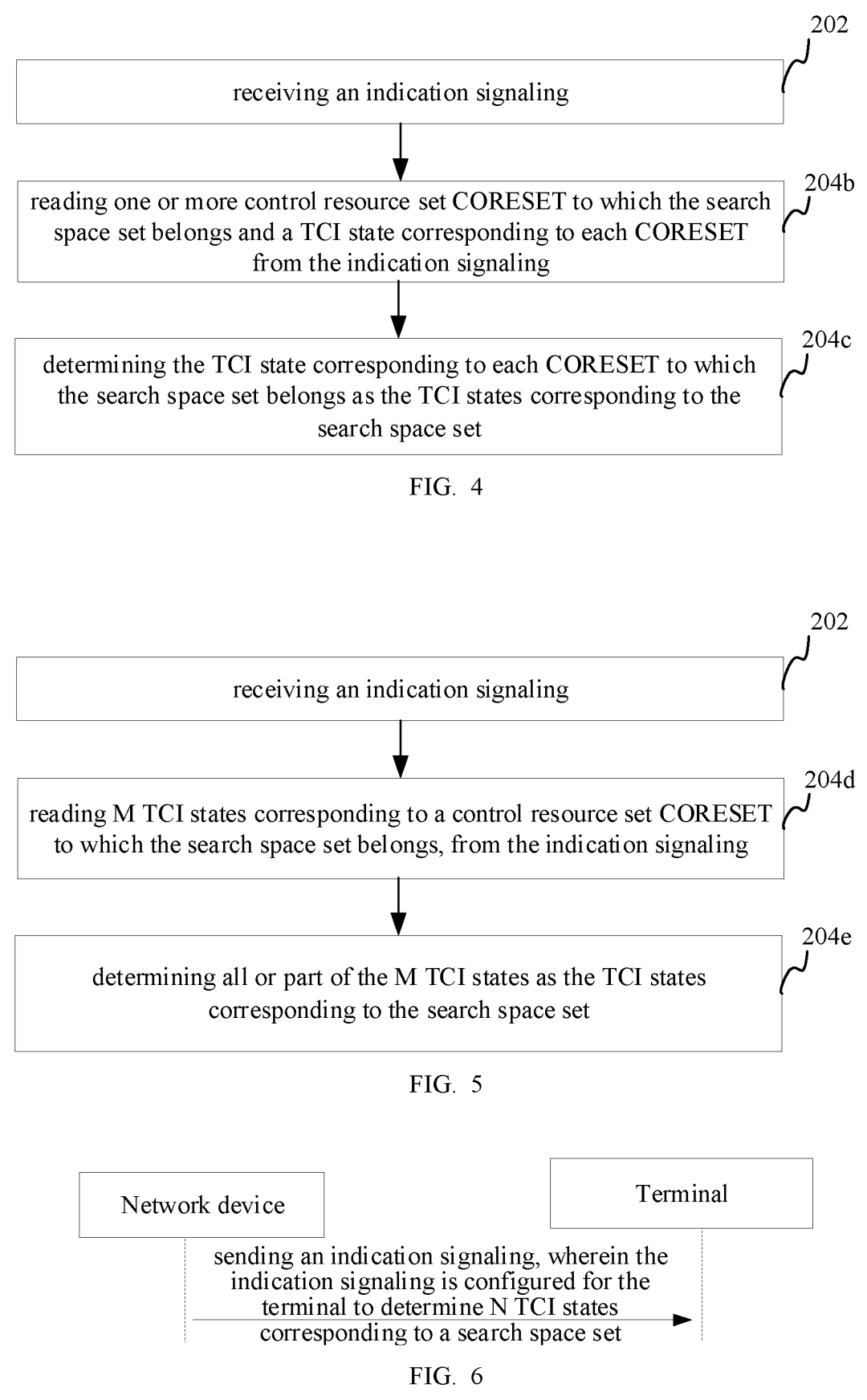

202 receiving an indication signaling

204d reading M TCI states corresponding to a control resource set CORESET to which the search space set belongs, from the indication signaling 204e determining all or part of the M TCI states as the TCI states corresponding to the search space set

FIG. 5

| Network device | Terminal | sending an indication signaling, wherein the indication signaling is configured for the terminal to determine N TCI states corresponding to a search space set

FIG. 6

TCI STATE DETERMINATION METHOD AND APPARATUS

CROSS-REFERENCE TO RELATED APPLICATION

This application is the US national phase application of International Application No. PCT/CN2020/120766, filed on Oct. 14, 2020, the entire contents of which are incorporated herein by reference for all purposes.

TECHNICAL FIELD

The present disclosure relates to a field of mobile communication technologies, and particularly to a method and an apparatus for detecting a transmission configuration indicator (TCI) state, a terminal and a medium.

BACKGROUND

In a New Radio (NR) wireless communication system, communication frequencies in the very high frequency (VHF) band may be used, such as frequency range (FR) 2. Since the high frequency channel attenuates rapidly, in order to ensure the coverage, it is necessary to use beam-based transmission and reception.

When the network device has multiple transmission and reception points (TRPs), the network device may use the multiple TRPs to provide services for the terminal, including using the multiple TRPs to send the physical downlink control Channel (PDCCH) to the terminal. In the traditional method, when the network device uses a TRP to send the PDCCH to the terminal, and a TCI state is configured for the control resource set (CORESET), then the TCI states of the search space sets associated with the CORESET are all the same as the TCI state of the CORESET.

When the method of repeatedly sending the PDCCHs with multiple TRPs is used, it is equivalent that the terminal needs to use beams corresponding to different TCI states to receive PDCCHs sent by different TRPs, and these multiple PDCCHs may come from the same or different search space sets (SS Sets). How to indicate the TCI states of the search space sets is a problem that needs to be solved.

SUMMARY

According to an aspect of the present disclosure, a method for determining a TCI state is provided. The method is applied in a terminal, and the method includes:

receiving an indication signaling;

determining N TCI states corresponding to a search space set of the terminal according to the indication signaling, where N is a positive integer.

According to another aspect of the present disclosure, a method for determining a TCI state is provided. The method is applied in a network device, and the method includes:

sending an indication signaling, wherein the indication signaling is configured for the terminal to determine N TCI states corresponding to a search space set, where N is a positive integer.

According to another aspect of the present disclosure, a terminal is provided. The terminal includes:

a processor;

a transceiver connected to the processor;

a memory configured to store executable instructions for the processor;

wherein, the processor is configured to load and execute the executable instructions to implement the method for determining the TCI state described above.

According to another aspect of the present disclosure, a network device is provided. The network device includes:

a processor;

a transceiver connected to the processor;

a memory configured to store executable instructions for the processor;

wherein, the processor is configured to load and execute the executable instructions to implement the method for determining the TCI state described above.

According to another aspect of the present disclosure, a computer-readable storage medium is provided. Executable instructions are stored in the computer-readable storage medium, and the executable instructions are loaded and executed by the processor to implement the method for determining the TCI state described above.

According to another aspect of the present disclosure, a computer program product is provided. Executable instructions are stored in the computer program product, and the executable instructions are loaded and executed by the processor to implement the method for determining the TCI state described above.

According to another aspect of the present disclosure, a chip is provided. The chip is configured to implement the method for determining the TCI state described above.

BRIEF DESCRIPTION OF THE DRAWINGS

In order to illustrate the technical solutions in embodiments of the present disclosure more clearly, the following briefly introduces the drawings that are used in the description of the embodiments. Obviously, the drawings in the following description are only some embodiments of the present disclosure. For those of ordinary skill in the art, other drawings can also be obtained from these drawings without creative effort.

FIG. 4 is a flowchart of a method for determining a TCI state provided by an exemplary embodiment of the present disclosure.

FIG. 5 is a flowchart of a method for determining a TCI state provided by an exemplary embodiment of the present disclosure.

FIG. 6 a flowchart of a method for determining a TCI state provided by an exemplary embodiment of the present disclosure.

DETAILED DESCRIPTION

In order to make the objectives, technical solutions and advantages of the present disclosure clearer, the embodiments of the present disclosure will be further described in detail below with reference to the accompanying drawings.

In all the following embodiments of the present disclosure, although different steps are numbered by numbers, these numbers are only for the purpose of making the text clearer, not for limiting the execution order of the steps and time slots. limited. In all the embodiments of the present disclosure, these numbered steps can be implemented individually or in any combination; when these steps are implemented in any combination, their execution order is not limited by the numbered numbers, that is, they can be performed in any order.

Figure 1:
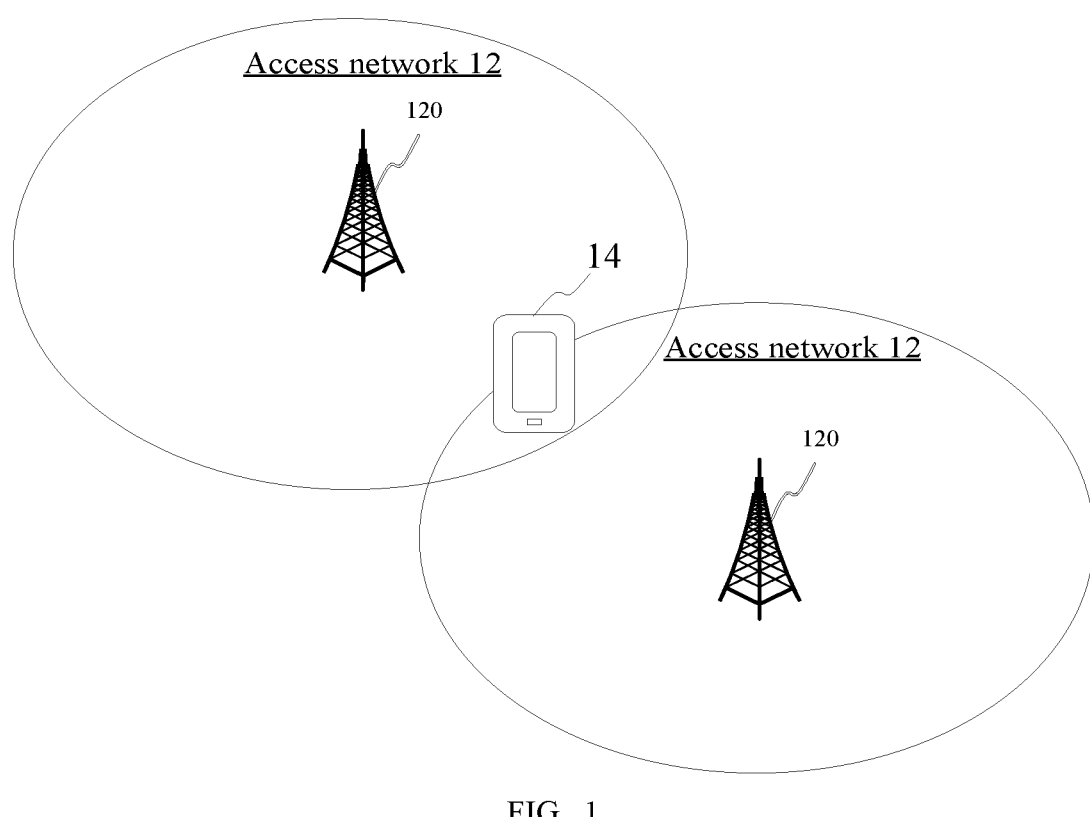
FIG. 1 is a schematic diagram of a communication system provided by an exemplary embodiment of the present disclosure.

FIG. 1 shows a block diagram of a communication system provided by an exemplary embodiment of the present disclosure. The communication system may include: an access network 12 and a terminal 14.

The access network 12 includes several network devices 120. The network device 120 may be a base station, which is a device deployed in the access network to provide a wireless communication function for the terminal. The base station may include various forms of macro base station, micro base station, relay station, access point and so on. In systems using different radio access technologies, the names of devices with base station functions may vary. For example, in LTE systems, they are called eNodeBs or eNBs; in 5G NR systems, they are called gNodeBs or gNBs. As communication technology evolves, the description of "base station" may change. For the convenience of description in the embodiments of the present disclosure, the above-mentioned apparatuses for providing a wireless communication function for the terminal 14 are collectively referred to as network devices. In vehicle networking communication, the network device may also be a vehicle terminal.

The terminal 14 may include various handheld devices, in-vehicle devices, wearable devices, computing devices or Internet of Things (Internet of Things, IoT) devices or Industrial Internet of Things (IIoT) devices or other processing equipment connected to wireless modems, and various forms of user equipment, mobile stations (Mobile Station, MS), terminal devices, and so on. For the convenience of description, the devices mentioned above are collectively referred to as terminals. The network device 120 and the terminal 14 communicate with each other through some air interface technology, such as a Uu interface.

The technical solutions of the embodiments of the present disclosure can be applied to various communication systems, for example, a frequency division duplex (Frequency Division Duplex, FDD) system, a time division duplex (Time Division Duplex, TDD) system, an advanced long term evolution (LTE-A) system, a New Radio (NR) system, an evolution system of the NR system, a LTE-based access to Unlicensed spectrum (LTE-U) system, a NR-U system, a Universal Mobile Telecommunication System (UMTS), a Worldwide Interoperability for Microwave Access (WiMAX) communication system, Wireless Local Area Networks (WLAN), Wireless Fidelity (WiFi), a next-generation communication system or other communication systems, etc.

Generally speaking, traditional communication systems support a limited number of connections and are easy to implement. However, with the development of communication technology, mobile communication systems will not only support traditional communication, but also support, for example, Device to Device (Device to Device, D2D) communication, Machine to Machine (M2M) communication, Machine Type Communication (MTC), Vehicle to Vehicle (V2V) communication and Vehicle to Everything (V2X) systems, etc. Embodiments of the present disclosure can also be applied to these communication systems.

The present disclosure proposes a method for indicating a transmission configuration indicator (TCI) state of a search space set, so that a terminal can determine respective TCI states corresponding to PDCCHs transmitted by multiple transmission and reception points (TRPs), thereby improving the success rate of receiving downlink control information (DCI) signaling.

Figure 2:
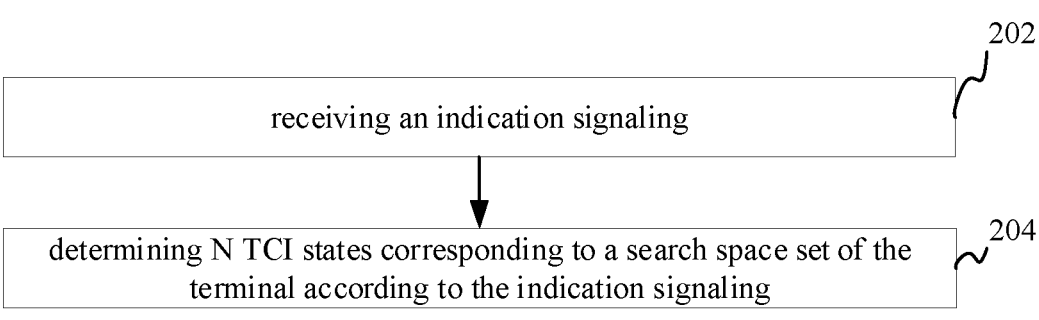
FIG. 2 a flowchart of a method for determining a TCI state provided by an exemplary embodiment of the present disclosure.

FIG. 2 shows a flowchart of a method for determining a TCI state provided by an embodiment of the present disclosure. This embodiment is exemplified by the method being executed by a terminal, and the method includes followings.

At step 202, an indication signaling is received.

The terminal receives the indication signaling sent by the network device. The indication signaling is at least one of a radio resource control (RRC) signaling, a medium access control (MAC) signaling, and a DCI signaling.

At step 204, N TCI states corresponding to a search space set (SS set) of the terminal are determined according to the indication signaling, where N is a positive integer.

The terminal determines N TCI states corresponding to the search space set of the terminal according to the indication signaling, where N may be one, or two or more than two.

To sum up, through the method provided in this embodiment, when the network device uses multiple TRPs to send PDCCH services for the terminal, when different SS sets of the same CORESET correspond to different TRPs, or different PDCCH candidates of the same SS set correspond to different TRPs, or one SS set corresponds to multiple CORESETs, a method for indicating TCI states of different SS sets or different PDCCH candidates is proposed, so that the terminal can receive the DCI sent on the corresponding PDCCH resource block according to the correct TCI state, to improve the decoding success rate of DCI.

The above-mentioned indication signaling may adopt an explicit configuration mode or an implicit configuration mode.

Figure 3:
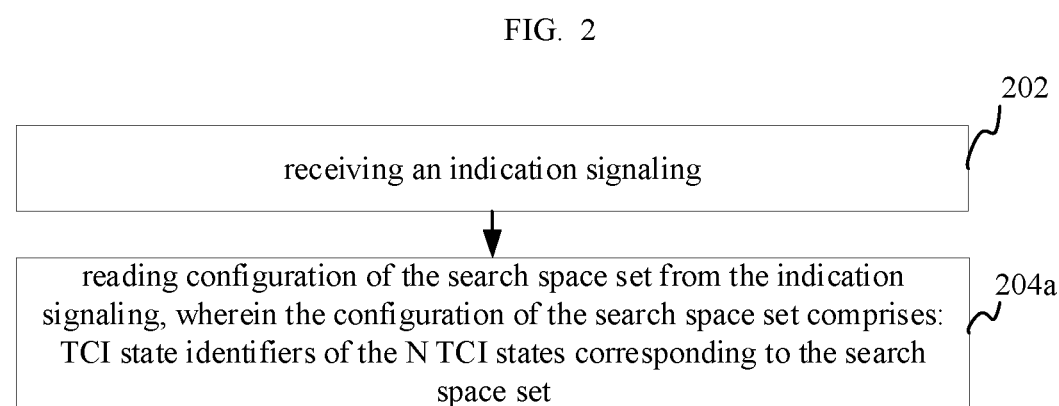
FIG. 3 is a flowchart of a method for determining a TCI state provided by an exemplary embodiment of the present disclosure.

For the explicit configuration mode:

In an optional embodiment based on FIG. 2, the above-mentioned step 204 may be alternatively implemented as step 204a, as shown in FIG. 3.

At step 204a, configuration of the search space set is read from the indication signaling, in which the configuration of the search space set includes: TCI state identifiers of N TCI states corresponding to the search space set.

When there are one or more search space sets, the terminal reads the configuration of each search space set from the indication signaling, and the configuration of the ith search space set includes the TCI state identifiers of Ni TCI states corresponding to the ith search space set, where i is a positive integer.

For example, the TCI state identifiers include: absolute identifiers of the TCI states.

For example, the network device sends a Radio Resource Control (RRC) signaling to the terminal, and the RRC signaling configures 64 TCI states for all CORESETs sending PDCCH, then the TCI state identifiers used for the search space set has one or more values taken from 0 to 63. That is, each TCI state also needs to be indicated by 6 bits (because there are 64 TCI states). As shown in Table 1:

5

TABLE 1

| Search space set | TCI state identifier |
|---|---|
| Search space set 1 | 000001, 000010, 000011 |
| Search space set 2 | 110001, 110010, 110011 |

For example, the TCI state identifiers include serial numbers of M TCI states corresponding to one CORESET to which the search space set belongs, sorted by numbers, where M is an integer greater than 1.

For example, the network device sends the RRC signaling to the terminal. The RRC signaling configures 64 TCI states for the CORESETs to which the search space sets belong. Then the network device sends the MAC signaling to the terminal. The MAC signaling configures the CORESET to which the search space set belongs with TCI #3, TCI #5, then the serial number of the TCI states corresponding to the search space set can be new TCI #0 (corresponding to TCI #3) and/or new TCI #1 (corresponding to TCI #5). That is, each TCI state only needs 1 bit to indicate, because the CORESET to which the search space set belongs is only configured with 2 TCI states.

To sum up, in the method provided in this embodiment, the network device sends the explicitly configured indication signaling to the terminal, so that when the network device uses multiple TRPs to send the PDCCH service for the terminal, the method for indicating the TCI states of different search space sets is proposed. The method enables the terminal to receive the DCI sent on the corresponding PDCCH resource block according to the correct TCI state, thereby improving the decoding success rate of the DCI.

For the implicit configuration mode:

The TCI state of each search space set has a default mapping relationship with the TCI state corresponding to the CORESET to which it belongs.

Mapping mode one (in no particular order):

In an optional embodiment based on FIG. 2, the above-mentioned step 204 may be alternatively implemented as step 204b and step 204c, as shown in FIG. 4.

At step 204b, one or more CORESET to which the search space set belongs and a TCI state corresponding to each CORESET are read from the indication signaling.

The same search space set may belong to one or more CORESETs.

Taking the search space set corresponding to multiple CORESETs as an example, the terminal reads at least two CORESETs and the TCI state corresponding to each CORESET from the indication signaling. Optionally, each CORESET corresponds to one TCI state.

At step 204c, the TCI state corresponding to each CORESET to which the search space set belongs are determined as the TCI states corresponding to the search space set.

The terminal determines the TCI states corresponding to respective CORESETs to which the same search space set belongs as the TCI states corresponding to the search space set.

Mapping Mode Two:

In an optional embodiment based on FIG. 2, the above-mentioned step 204 may be alternatively implemented as step 204d and step 204e, as shown in FIG. 5.

At step 204d, M TCI states corresponding to the CORESET to which the search space set belongs are read from the indication signaling, where M is a positive integer.

The same search space set may belong to one or more CORESETs. Each CORESET corresponds to M TCI states. It should be noted that the number of TCI states corresponding to each CORESET is the same or different. When there are at least two CORESETs corresponding to different TCI states, the number of TCI states corresponding to the i-th CORESET is $M_i$.

In one example, M is an integer greater than one. That is, there may be multiple TCI states corresponding to one CORESET.

Taking the search space set corresponding to one CORESET as an example, the terminal reads the CORESET and M TCI states corresponding to the CORESET from the indication signaling. Taking the search space set corresponding to more than two CORESETs as an example, the terminal reads at least two CORESETs and Mi TCI states corresponding to each CORESET from the indication signaling. The number of TCI states corresponding to the i-th CORESET is Mi, and i is a positive integer.

At step 204e, all or a part of the M TCI states are determined as the TCI states corresponding to the search space set.

The terminal determines N TCI states among the M TCI states as the TCI states corresponding to a single search space set, where N is an integer not greater than M. Alternatively, the terminal determines one or more TCI states in the M TCI states as a TCI state corresponding to a single search space set. There can be multiple search space sets belonging to the same CORESET.

Optionally, in the case of N=1, the terminal determines one TCI state among the M TCI states as the TCI state corresponding to the search space set according to the preset mapping relationship. That is, the terminal determines one TCI state among the M TCI states as the TCI state corresponding to a single search space set. At least one of the following three methods can be used.

The terminal determines a TCI state corresponding to the search space set with a cyclic mapping method according to the identifier of the search space set.

For example, M is 2, that is, CORESET is configured with 2 TCI states (TCI #3 and TCI #5). Then, SS set IDs of 0, 2, 4 . . . correspond to TCI #3; SS set IDs of 1, 3, 5 . . . correspond to TCI #5.

The terminal determines a TCI state corresponding to the search space set with a sequential mapping method according to the identifier of the search space set.

For example, M is 2, that is, CORESET is configured with 2 TCI states (TCI #3 and TCI #5). SS set IDs 0, 1, and 2 correspond to TCI #3; SS set IDs 3, 4, and 5 correspond to TCI #5.

The terminal determines a search space set group (pair) corresponding to the search space set, and the M search space sets in the search space set group are in one-to-one correspondence with the M TCI states.

For example, M is 2, that is, CORESET is configured with 2 TCI states (TCI #3 and TCI #5). One search space set group includes search space set #0 and search space set #1, then search space set #0 corresponds to TCI #3, and search space set #1 corresponds to TCI #5. Another search space set group includes search space set #2 and search space set #3, then search space set #2 corresponds to TCI #3, and search space set #3 corresponds to TCI #5. That is, the search space set with the smaller ID corresponds to the TCI state with the smaller number.

In this case, when there is at least one search space set that does not appear in the form of a group, by default, these search space sets correspond to M TCI states of the CORESET, or a TCI state with the smallest number among the M TCI states.

To sum up, in the method provided in this embodiment, the network device sends the implicitly configured indication signaling to the terminal. Compared with the previous embodiment, the amount of data that the indication signaling needs to carry can be reduced, thereby saving air interface resources.

Based on the foregoing embodiments, when one search space set corresponds to multiple TCI states, two cases may also be included.

Each PDCCH candidate in the search space set corresponds to the multiple TCI states.

In the case where the search space set is the first search space set corresponding to multiple TCI states, and the first search space set includes at least two PDCCH candidates, each PDCCH candidate in the at least two PDCCH candidates corresponds to the multiple TCI states.

Different PDCCH candidates in the search space set correspond to different TCI states.

When the search space set is a first search space set corresponding to multiple TCI states, and the first search space set includes at least two PDCCH candidates, different PDCCH candidates in the at least two PDCCH candidates correspond to different TCI states.

In an example, the terminal reads the TCI state identifiers corresponding to at least two PDCCH candidates from the indication signaling. For example, the indication signaling is explicitly configured with the TCI state identifier corresponding to each PDCCH candidate. The TCI state identifiers are absolute identifiers, and the TCI absolute identifiers may be 0-63; or the TCI state identifiers are the serial numbers of the multiple TCI state identifiers corresponding to the first search space set reordered according to the numbers. For example, for TCI #3 and TCI #5 corresponding to the first search space set, the serial numbers of the TCI states corresponding to the at least two PDCCH candidates may be new TCI #0 (corresponding to TCI #3) and/or new TCI #1 (corresponding to TCI #5). In this way, the TCI state identifier corresponding to each PDCCH candidate only needs to be indicated by 1 bit.

In another example, the terminal determines TCI states corresponding to the at least two PDCCH candidates in a cyclic mapping manner. For example, the first search space set corresponds to TCI state #1 and TCI state #2, and four PDCCH candidates correspond to TCI state #1, TCI state #2, TCI state #1, and TCI state #2 respectively.

In another example, the terminal determines TCI states corresponding to at least two PDCCH candidates in a sequential mapping manner. For example, the first search space set corresponds to TCI state #1 and TCI state #2, and four PDCCH candidates correspond to TCI state #1, TCI state #1, TCI state #2, and TCI state #2 respectively.

It should be noted that the PDCCH aggregation levels of at least two PDCCH candidates are the same or different.

To sum up, in the method provided in this embodiment, when the network device uses multiple TRPs to send PDCCH services for the terminal, when different PDCCH candidates of the same SS set correspond to different TRPs, the method for indicating the TCI states of different PDCCH candidates is proposed. The method enables the terminal to receive the DCI sent on the corresponding PDCCH resource block according to the correct TCI state, thereby improving the decoding success rate of the DCI.

FIG. 6 shows a flowchart of a method for determining a TCI state provided by an exemplary embodiment of the present application. In this embodiment, the method is applied to a network device, and the method includes the followings.

At step 620, an indication signaling is sent, in which the indication signaling is configured for the terminal to determine N TCI states corresponding to a search space set, where N is a positive integer.

In a possible design, the indication signaling carries configuration of the search space set, and the configuration of the search space set includes: TCI state identifiers of N TCI states corresponding to the search space set. Optionally, the TCI state identifiers include: absolute identifiers of the TCI states; or, the serial numbers of M TCI states corresponding to a CORESET to which the search space set belongs, sorted by numbers, where M is an integer greater than 1.

In a possible design, the indication signaling carries the CORESET to which the search space set belongs and the TCI state corresponding to the CORESET. Optionally, there are one or more CORESETs to which the search space set belongs, and each CORESET corresponds to one TCI state.

In a possible design, the indication signaling carries: M TCI states corresponding to the CORESET to which the search space set belongs, where M is a positive integer. It should be noted that there are one or more CORESETs to which the search space set belongs, and the number of TCI states corresponding to each CORESET is the same or different. When there are at least two CORESETs corresponding to different TCI states, the number of TCI states corresponding to the i-th CORESET is $M_i$. i is a positive integer.

In a possible design, the search space set is a first search space set corresponding to multiple TCI states, and the first search space set includes at least two PDCCH candidates, in which, each of the at least two PDCCH candidates corresponds to the multiple TCI states.

In a possible design, the search space set is a first search space set corresponding to multiple TCI states, and the first search space set includes at least two PDCCH candidates; in which different PDCCH candidates in the at least two PDCCH candidates correspond to different TCI states.

In a possible design, the indication signaling further carries:

TCI states corresponding to at least two PDCCH candidates respectively.

In a possible design, the indication signaling is at least one of RRC signaling, MAC signaling, and DCI signaling.

Figure 7:
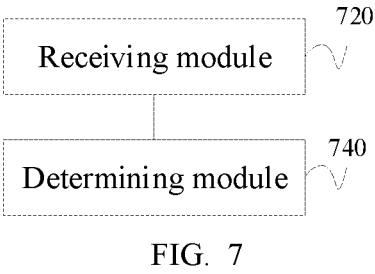
FIG. 7 is a block diagram of an apparatus for determining a TCI state provided by an exemplary embodiment of the present disclosure.

FIG. 7 shows a block diagram of an apparatus for determining a TCI state provided by an exemplary embodiment of the present disclosure. The apparatus may be implemented as all or a part of a terminal, or the apparatus may be applied in a terminal, and the apparatus includes a receiving module 720 and a determining module 740.

The receiving module 720 is configured to receive an indication signaling.

The determining module 740 is configured to determine, according to the indication signaling, N TCI states corresponding to a search space set of the terminal, where N is a positive integer.

In a possible design, the determining module 740 is configured to read configuration of the search space set from the indication signaling, in which the configuration of the search space set includes: TCI state identifiers of the N TCI states corresponding to the search space set.

In a possible design, the TCI state identifiers include: absolute identifiers of the TCI states; or, serial numbers of M TCI states corresponding to a CORESET to which the search space set belongs, sorted by numbers, where M is a positive integer.

In a possible design, the determining module 740 is configured to read the CORESET to which the search space set belongs and the TCI state corresponding to the CORESET from the indication signaling, optionally, there is one or more CORESET to which the search space set belongs, each CORESET corresponds to one TCI state; determine the TCI states corresponding to respective CORESETs to which the search space set belongs as the TCI states corresponding to the search space set.

In a possible design, the determining module 740 is configured to read, from the indication signaling, M TCI states corresponding to the CORESET to which the search space set belongs, where M is an integer greater than 1; determine all or part of the TCI states as the TCI states corresponding to the search space set. Optionally, there are one or more CORESETs to which the search space set belongs.

In a possible design, the determining module 740 is configured to determine, according to a preset mapping relationship, one TCI state in the M TCI states as the TCI state corresponding to the search space set.

In a possible design, the determining module 740 is configured to determine a TCI state corresponding to the search space set in a cyclic mapping manner according to the identifier of the search space set; or, the determining module 740 is configured to determine a TCI state corresponding to the search space set in a sequential mapping manner according to the identifier of the search space set; or, the determining module 740 is configured to determine a search space set group corresponding to the search space set, in which M search space sets in the search space set group are in one-to-one correspondence with the M TCI states.

In a possible design, the search space set is a first search space set corresponding to multiple TCI states, and the first search space set includes at least two PDCCH candidates; wherein, each of the at least two PDCCH candidates corresponds to the multiple states.

In a possible design, the search space set is a first search space set corresponding to multiple TCI states, and the first search space set includes at least two PDCCH candidates; wherein, different PDCCH candidates in the at least two PDCCH candidates correspond to different TCI states.

In a possible design, the determining module 740 is configured to read the TCI states corresponding to the at least two PDCCH candidates from the indication information.

In a possible design, the determining module 740 is configured to determine the TCI states corresponding to the at least two PDCCH candidates in a cyclic mapping manner; or, the determining module 740 is configured to determine the TCI states corresponding to at least two PDCCH candidates in a sequential mapping manner.

In a possible design, the indication signaling is at least one of RRC signaling, MAC signaling and DCI signaling.

Figure 8:
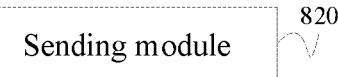
FIG. 8 is a block diagram of an apparatus for determining a TCI state provided by an exemplary embodiment of the present disclosure.

FIG. 8 shows a block diagram of an apparatus for determining a TCI state provided by an exemplary embodiment of the present disclosure. The apparatus may be implemented as all or a part of a network device, or the apparatus may be applied in a network device, and the apparatus includes a sending module 820.

The sending module 820 is configured to send an indication signaling, wherein the indication signaling is configured for the terminal to determine N TCI states corresponding to a search space set, where N is a positive integer.

In a possible design, the indication signaling carries configuration of the search space set, and the configuration includes: TCI state identifiers of N TCI states corresponding to the search space set.

In a possible design, the TCI state identifiers include: absolute identifiers of the TCI states; or, serial numbers of M TCI states corresponding to a CORESET to which the search space set belongs sorted by numbers, where M is a positive integer.

In a possible design, the indication signaling carries one or more control resource sets CORESET to which the search space set belongs and a TCI state corresponding to each CORESET.

In a possible design, the indication signaling carries M TCI states corresponding to each CORESET to which the search space set belongs, where M is a positive integer.

In a possible design, the search space set is a first search space set corresponding to multiple TCI states, and the first search space set includes at least two PDCCH candidates; wherein, each of the at least two PDCCH candidates corresponds to the multiple TCI states.

In a possible design, the search space set is a first search space set corresponding to multiple TCI states, and the first search space set includes at least two PDCCH candidates; wherein, different PDCCH candidates in the at least two PDCCH candidates correspond to different TCI states.

In a possible design, the indication signaling further carries: TCI states corresponding to the at least two PDCCH candidates respectively.

In a possible design, the indication signaling is at least one of a RRC signaling, a MAC signaling or a DCI signaling.

Figure 9:
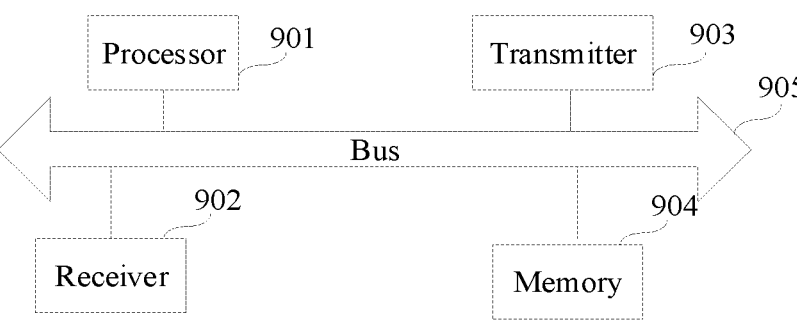
FIG. 9 is a block diagram of a communication device provided by an exemplary embodiment of the present disclosure.

FIG. 9 shows a schematic structural diagram of a communication device (terminal or network device) provided by an exemplary embodiment of the present disclosure. The communication device includes: a processor 901, a receiver 902, a transmitter 903, a memory 904 and a bus 905.

The processor 901 includes one or more processing cores, and the processor 901 executes various functional applications and information processing by running software programs and modules.

The receiver 902 and the transmitter 903 may be implemented as a communication component, which may be a communication chip or transceiver.

The memory 904 is connected to the processor 901 through the bus 905.

The memory 904 may be configured to store at least one instruction, and the processor 901 may be configured to execute the at least one instruction to implement the various steps in the above method embodiments.

Moreover, the memory 904 may be implemented by any type or combination of volatile or non-volatile storage devices including, but not limited to, magnetic or optical disks, electrically erasable programmable Read Only Memory (EEPROM), Erasable Programmable Read Only Memory (EPROM), Static Anytime Access Memory (SRAM), Read Only Memory (ROM), Magnetic Memory, Flash Memory, Programmable Read Only Memory (PROM).

In an exemplary embodiment, a computer-readable storage medium is further provided, wherein the computer-readable storage medium stores at least one instruction, at least one piece of program, code set or instruction set, the at least one instruction. The at least one piece of program, the code set or the instruction set is loaded and executed by the processor to implement the method for determining the TCI state executed by the terminal or the network device provided by the above method embodiments.

In an exemplary embodiment, a computer-readable storage medium is further provided, wherein the computer-readable storage medium stores at least one instruction, at least one piece of program, code set or instruction set, the at least one instruction. The At least one section of program, the code set or the instruction set is loaded and executed by the processor to implement the method for determining the TCI state provided by the above method embodiments.

Those of ordinary skill in the art can understand that all or part of the steps of implementing the above embodiments can be completed by hardware, or can be completed by instructing relevant hardware through a program, and the program can be stored in a computer-readable storage medium. The storage medium mentioned may be a read-only memory, a magnetic disk or an optical disk, etc.

The above are only optional embodiments of the present application, and are not intended to limit the present application. Any modifications, equivalent replacements, improvements, etc. made within the spirit and principles of the present application shall be included in the protection of the present application. within the range.

What is claimed is:

1. A method for determining a transmission configuration indication (TCI) state, performed by a terminal, comprising:
   receiving an indication signaling; and
   determining N TCI states corresponding to a search space set of the terminal according to the indication signaling, wherein N is a positive integer;
   wherein the search space set is a first search space set corresponding to multiple TCI states, and the first search space set comprises at least two PDCCH candidates; wherein,
   each of the at least two PDCCH candidates corresponds to the multiple TCI states.

2. The method of claim 1, wherein determining N TCI states corresponding to the search space set of the terminal according to the indication signaling, comprises:
   reading configuration of the search space set from the indication signaling, wherein the configuration of the search space set comprises: TCI state identifiers of the N TCI states corresponding to the search space set.

3. The method of claim 2, wherein the TCI state identifiers comprises:
   absolute identifiers of the TCI state;
   or,
   serial numbers of M TCI states corresponding to a control resource set (CORESET) to which the search space set belongs, sorted by numbers, where M is a positive integer.

4. The method of claim 1, wherein determining the TCI states corresponding to the search space set of the terminal according to the indication signaling comprises:
   reading one or more CORESETs to which the search space set belongs and a TCI state corresponding to each CORESET from the indication signaling; and
   determining the TCI state corresponding to each CORESET to which the search space set belongs as the TCI states corresponding to the search space set.

5. The method of claim 1, wherein determining the TCI states corresponding to the search space set of the terminal according to the indication signaling comprises:
   reading M TCI states corresponding to a control resource set CORESET to which the search space set belongs, from the indication signaling, where M is a positive integer; and
   determining all or part of the M TCI states as the TCI states corresponding to the search space set.

6. The method of claim 5, wherein determining all or a part of the M TCI states as the TCI states corresponding to the search space set comprises:
   determining one TCI state in the M TCI states as the TCI state corresponding to the search space set according to a preset mapping relationship.

7. The method of claim 6, wherein determining one of the M TCI states as the TCI state corresponding to the search space set according to the preset mapping relationship comprises:
   determining a TCI state corresponding to the search space set in a cyclic mapping manner according to an identifier of the search space set;
   or,
   determining a TCI state corresponding to the search space set in a sequential mapping manner according to an identifier of the search space set;
   or,
   determining a search space set group corresponding to the search space set, wherein M search space sets in the search space set group are in one-to-one correspondence with the M TCI states.

8. The method of claim 1, wherein the indication signaling is at least one of a radio resource control (RRC) signaling, a medium access control (MAC) signaling, or a downlink control information (DCI) signaling.

9. A method for determining a TCI state, performed by a network device, comprising:
   sending an indication signaling to a terminal, wherein the indication signaling is configured for the terminal to determine N TCI states corresponding to a search space set, where N is a positive integer;
   wherein the search space set is a first search space set corresponding to multiple TCI states, and the first search space set comprises at least two PDCCH candidates; wherein,
   each of the at least two PDCCH candidates corresponds to the multiple TCI states.

10. The method of claim 9, wherein the indication signaling carries:
   configuration of the search space set, in which the configuration of the search space set comprises TCI state identifiers of the N TCI states corresponding to the search space set,
   wherein the TCI state identifiers comprise:
   absolute identifiers of the TCI states;
   or,
   serial numbers of M TCI states corresponding to a control resource set CORESET to which the search space set belongs, sorted by numbers, where M is a positive integer.

11. The method of claim 9, wherein the indication signaling carries:
   one or control resource set CORESET to which the search space set belongs and a TCI state corresponding to each CORESET.

12. The method of claim 9, wherein the indication signaling carries:
   M TCI states corresponding to a control resource set CORESET to which the search space set belongs, where M is a positive integer.

13. A terminal, comprising:
   a processor;
   a transceiver connected to the processor;
   a memory configured to store executable instructions that, when executed by the processor, cause the terminal to;
   receive an indication signaling; and determine N TCI states corresponding to a search space set of the terminal according to the indication signaling, where N is a positive integer;

wherein the search space set is a first search space set corresponding to multiple TCI states, and the first search space set comprises at least two PDCCH candidates; wherein, each of the at least two PDCCH candidates corresponds to the multiple TCI states.

14. A network device, comprising:

a processor;

a transceiver connected to the processor; and a memory configured to store executable instructions that, when executed by the processor, cause the network device to implement the method of claim 9.

\* \* \* \* \*